US008368511B2

(12) United States Patent
Johnson

(10) Patent No.: US 8,368,511 B2
(45) Date of Patent: Feb. 5, 2013

(54) METHOD FOR MONITORING A PACKAGE, SENTINEL INDICATOR SYSTEM AND LOGISTICS SYSTEM

(75) Inventor: Brian Johnson, Surprise, AZ (US)

(73) Assignee: Deutsche Post AG, Bonn (DE)

( * ) Notice: Subject to any disclaimer, the term of this patent is extended or adjusted under 35 U.S.C. 154(b) by 421 days.

(21) Appl. No.: 12/532,495

(22) PCT Filed: Mar. 19, 2008

(86) PCT No.: PCT/EP2008/002199
§ 371 (c)(1),
(2), (4) Date: Mar. 11, 2010

(87) PCT Pub. No.: WO2008/113574
PCT Pub. Date: Sep. 25, 2008

(65) Prior Publication Data

US 2010/0164686 A1 Jul. 1, 2010

Related U.S. Application Data

(60) Provisional application No. 60/919,715, filed on Mar. 22, 2007.

(51) Int. Cl.
*G05B 19/00* (2006.01)
*H04Q 5/22* (2006.01)
*G01D 3/00* (2006.01)

(52) U.S. Cl. ................... 340/5.92; 340/572.1; 340/10.1; 340/10.3; 340/568.1; 702/108; 702/188; 702/187

(58) Field of Classification Search ............. 340/539.31, 340/652, 635, 945, 984, 505, 540, 541, 572.1, 340/673, 570, 568.1, 5.92; 702/50–56, 108, 702/188, 187, 122; 705/28; 109/41, 42
See application file for complete search history.

(56) References Cited

U.S. PATENT DOCUMENTS

| | | | | |
|---|---|---|---|---|
| 6,826,514 | B1 * | 11/2004 | Antico et al. | 702/188 |
| 7,454,507 | B2 * | 11/2008 | Nakata et al. | 709/228 |
| 7,495,558 | B2 * | 2/2009 | Pope et al. | 340/572.1 |
| 2008/0079575 | A1 * | 4/2008 | Alicot et al. | 340/568.1 |

FOREIGN PATENT DOCUMENTS

| | | | |
|---|---|---|---|
| DE | 10052941 | A1 | 5/2002 |
| EP | 1626252 | A1 | 2/2006 |
| WO | WO2006/072268 | A1 | 7/2006 |

OTHER PUBLICATIONS

PCT International Search Report for PCT/EP2008/002199, International Filing Date Mar. 19, 2008.

* cited by examiner

*Primary Examiner* — Daniel Wu
*Assistant Examiner* — Mancil Littlejohn
(74) *Attorney, Agent, or Firm* — International IP Law Group PLLC

(57) ABSTRACT

There is provided a method for monitoring a package for storage and/or transport of at least one item. An exemplary method comprises receiving at a transmission unit measured data about properties of the item and/or about influences on the item via at least two sensors. The exemplary method also comprises executing via the transmission unit a decision of a logical node of a logistics system about a selection of data transmitted to a receiving unit. The exemplary method additionally comprises sending information about the desired selection of data from a control unit to the transmission unit. Finally, the exemplary method comprises enabling a user to make a selection relating to types of data to be transmitted.

16 Claims, 4 Drawing Sheets

METHOD FOR MONITORING A PACKAGE, SENTINEL INDICATOR SYSTEM AND LOGISTICS SYSTEM

CROSS REFERENCE TO RELATED APPLICATIONS

Pursuant to 35 U.S.C. §371, this application is the United States National Stage Application of International Patent Application No. PCT/EP2008/002199, filed on Mar. 19, 2008, the contents of which are incorporated by reference as if set forth in their entirety herein, which is entitled to the benefit of U.S. Provisional Patent Application No. 60/919,715, filed Mar. 22, 2007, the contents of which are incorporated by reference as if set forth in their entirety herein.

BACKGROUND

It is known, to monitor physical properties of packages during their transport. A method for securing and monitoring of containers and a container with securing and monitoring devices is known from the international patent application with the publication number WO 2006/072268.

SUMMARY OF THE INVENTION

Exemplary embodiments of the present invention relate to a method and a system for monitoring a package for storage and/or transport of at least one item.

It is desirable to create a method which allows an improved maintenance of the transport of items.

It is furthermore desirable to create a sentinel indicator system capable of carrying out this method.

Furthermore, it is desirable to create a logistics system which comprises this sentinel indicator system.

Exemplary embodiments of the present invention include a method for monitoring a package for storage and/or transport of at least one item, wherein data about properties of the item and/or about influences on the item are measured.

This method may be carried out in a way that at least two sensors are equipped in a way enabling them for measuring the data, wherein a transmission unit relates the data of the at least two sensors.

This method may be carried out in a way that at least two sensors are equipped in a way enabling them for measuring the data, wherein a transmission unit receives the data of the at least two sensors and executes a decision about a selection of data to be transferred.

This allows e.g. a flexible choice, if different data should be transmitted from the transponder to a receiving unit.

An example for this is, that e.g. the position data of the item—respectively the package are transmitted, whereas other properties, e.g. the temperature of the item are not transmitted.

This allows different qualities of service/service levels.

According to an exemplary embodiment of the invention, the method may be carried out in a way, respectively the sentinel indicator system is configured in a way, that the transmission unit is a transponder.

It is furthermore advantageous, that the transmission unit operates according to a mobile communication standard.

According to an exemplary embodiment of the invention, a logical node of a logistics system decides about a selection of data which is transmitted from the transmission unit to the receiving unit.

According to an exemplary embodiment of the method, the sentinel indicator system and the logistics system, that at least one of the sensors is equipped in a way, that it is capable of detecting an influence of parameters which require a change of the transmission of data.

In an exemplary embodiment, a controlling unit sends information to the units (transponders) about a desired selection of data.

A user may be enabled to make the selection of the types of data to be transmitted.

Advantageously, the user may be enabled to perform this selection at a webpage.

Exemplary embodiments of the present invention may allow an implementation of this selection in an operation of a logistics system and/or in the operation of a sentinel indicator system.

The order of the user may be transmitted to the sentinel indicator system in an appropriate way, e.g. using a communication system for communication between the sentinel indicator system and logical nodes of the logistics system.

Sensors, which control parameters of the item, the items, or the package transporting them are called sentinel sensors, because the data measured by them allows to assure, that the items can protected from hazardous influences.

To improve the functionality of this sentinel function, an exemplary embodiment of the present invention includes a sentinel indicator system, comprising:

- a sending unit including an integrated circuit coupled with an antenna;
- at least two sentinel sensors that monitor at least two physical parameters of an item
- a determining module for receiving time- and temperature dependent measurement data from the sentinel sensor and determining a current status by applying the measurement data to the trend data from the memory module;
- a communication interface to the transmission unit permitting a reader to retrieve current status data corresponding to the status determined by the determining module; and a power management module.
- wherein the integrated circuit comprises alert and sensor status data and program instructions for relaying communications between the receiving unit and the sensor.

An implementation of an exemplary embodiment of the present invention further comprises one or more additional sentinel sensors also communicatively coupled with a radio frequency identification (RFID) transponder permitting the same or a different RFID reader, or both, to retrieve item data measured by the one or more additional sensors.

According to an exemplary embodiment of the invention, at least one of the sensors is connected to a memory module which stores predefined/or measured data.

In one exemplary embodiment, the memory module further comprises a RFID transponder portion for controlling the RFID transponder, and a dedicated sensor portion comprising the sensor data.

According to an exemplary embodiment of the invention, the RFID transponder portion comprises alert and sensor status data, and program instructions for relaying communications between the RFID reader and the sensor.

In an exemplary embodiment of the invention, the monitoring module compares the status data to one or more predetermined trends, and provides an alert when an impact factor for the item has reached a critical value.

Examples for impact factors are temperature, pressure, humidity or radiation.

According to an exemplary embodiment of the invention, the sentinel indicator system further comprises one or more additional item integrity sensors also communicatively coupled with said transponder permitting the same or a different reader, or both, to retrieve item data measured by the one or more additional sensors.

In one exemplary embodiment of the invention, the memory module comprises a transponder portion for controlling the transponder, and a dedicated sensor portion comprising the sensor data.

According to an exemplary embodiment of the invention, the transponder portion comprises alert and sensor status data, and program instructions for relaying communications between the reader and the sensor.

According to an exemplary embodiment of the invention, the power management module periodically activates the monitoring component from a sleep or other low power state to gather the sensor measurements.

An exemplary embodiment of the present invention furthermore comprises a logistics system for a transport of the package with at least one item from a starting point to a receiving point, which is characterized in that it contains a logical node, which is capable of sending controlling information—to at least two sensors of a sentinel indicating system and that it furthermore contains at least one reading unit for receiving data from the sentinel sensors.

An exemplary embodiment of the logistics system is characterized in that the controlling information is transmitted by a transponder.

It is furthermore advantageous, that the controlling information is transmitted according to a telecommunication standard.

An exemplary embodiment of the present invention further includes, that logical node of a logistics system decides about a selection of a data which is transmitted from the transmission unit to the receiving unit.

DETAILED DESCRIPTION OF SPECIFIC EMBODIMENTS

An exemplary embodiment of the present invention can be carried out in a huge number of implementations.

It is especially advantageous to implement a sentinel indicator system which allows a monitoring of influences on one or more items.

The one or more items are preferably packed in an appropriate package 10. The package can consist on various materials as wood, plastic, metals or combinations there from.

It is furthermore possible to implement a protective coating 100.

Figure 1:
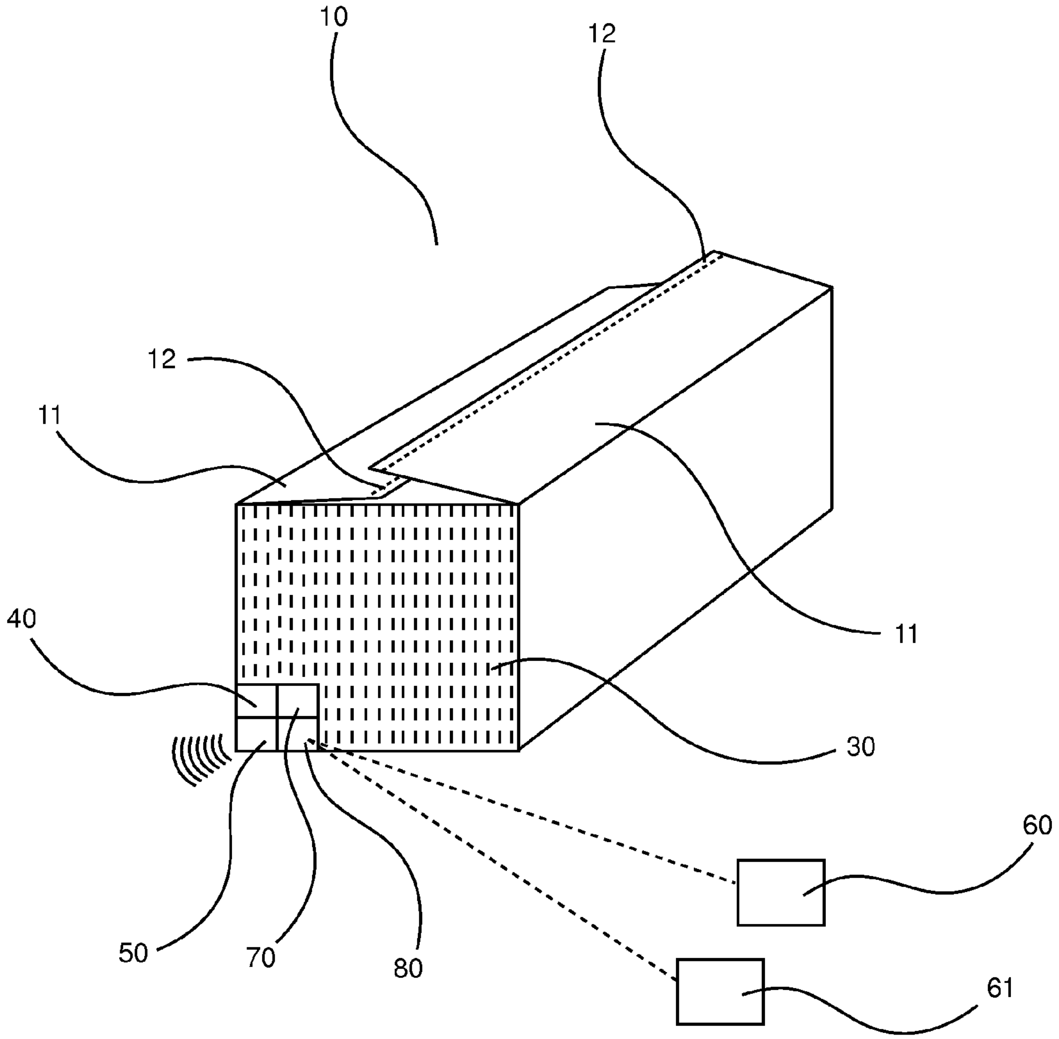
FIG. 1 is a schematic diagram of a package according to an exemplary embodiment of the present invention.
Figure 2:
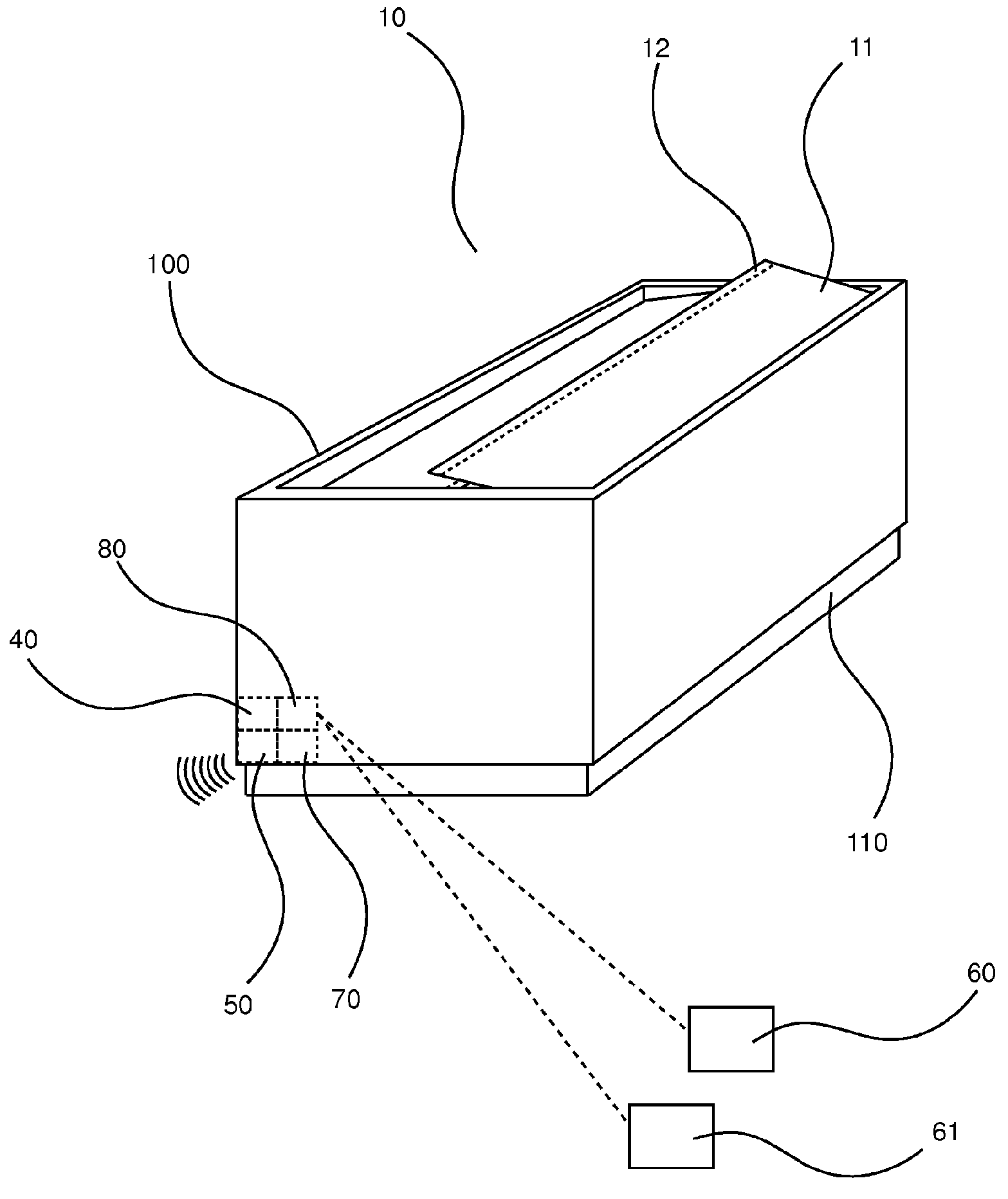
FIG. 2 is a schematic diagram of a package with a protective coating according to an exemplary embodiment of the present invention.

Such a package with a protective coating is represented in FIG. 2. In an especially advantageous implementation of the invention the protective coating 100 comprises a bottom 110.

To calculate impact factors derived from measured data of the sensors, the sensors are connected to a computation device 40. The computation device contains preferably a calculation device for calculating impact factors—especially derived from a comparison of measured data with a desired and/or allowed data. Furthermore, the computation device 40 comprises in an advantageous implementation at least one storage device.

It is furthermore useful to integrate at least one power management module. The power management module comprises in an advantageous implementation a power source and a regulator for regulating a power flow from the power source to the sensors and/or the transponder.

It is especially advantageous to implement at least one position determination device 50 for determining the position of the package, respectively the item/items contained in the package.

One suitable way for implementing a position determination device 50 is the usage of a receiver according a global navigation satellite system.

Global Navigation Satellite System (GNSS) is the standard generic term for satellite navigation systems that provide autonomous geo-spatial positioning with global coverage. A GNSS allows small electronic receivers to determine their location (longitude, latitude, and altitude) to within a few meters using time signals transmitted along a line of sight by radio from satellites. Receivers on the ground with a fixed position can also be used to calculate the precise time as a reference for scientific experiments.

As of 2007, the United States NAVSTAR Global Positioning System (GPS) is the only fully operational GNSS. The Russian GLONASS is a GNSS in the process of being restored to full operation. The European Union's Galileo positioning system is a next generation GNSS in the initial deployment phase, scheduled to be operational in 2010.

Alternatively, it is possible to use position sensors functioning with different methods. For example, it is possible to determine the position between the transponder and one or more readers.

It is possible to use at least one module operating according to a RFID standard, a WIFI standard, or a mobile communication standard as Bluetooth, GPRS, GSM or UMTS or capable of performing satellite communication. The usage of a Bluetooth module, a GSM module, GPRS or a UMTS module is especially advantageous as it allows a determination of the position as well as a transmission of a measured data.

The usage of the transponder combines the advantages of a position determination with a transmission of data.

It is possible to combine one or more different position determination devices.

The package or a container containing the package may contain one or more sensors. The sensors control e.g. atmospheric conditions, temperature, humidity, pressure or shock.

It is furthermore advantageous to implement at least one item deducting device in the package. The item deducting device operates for registering the items in the package and is capable of transmitting data about the registered items to a data processing unit.

An example of the item deduction unit is an antenna which is integrated into the package. In this case it is especially advantageous to implement separate receivers into the items.

By a registration of the items it is useful to register at least the number of items contained in the package and to transmit this number to the data processing unit.

In a preferred embodiment, the package contains a communication module 80, which is connected to the data processing unit 40.

The communication module 80 is in a preferred embodiment a transponder.

This transponder allows a continuous transmission of data or alternatively a transmission of data by occurrence of an event or after a certain period of time.

For example, it is possible to operate the transponders in a way, that they transmit data only if they are ordered to do so.

Figure 3:
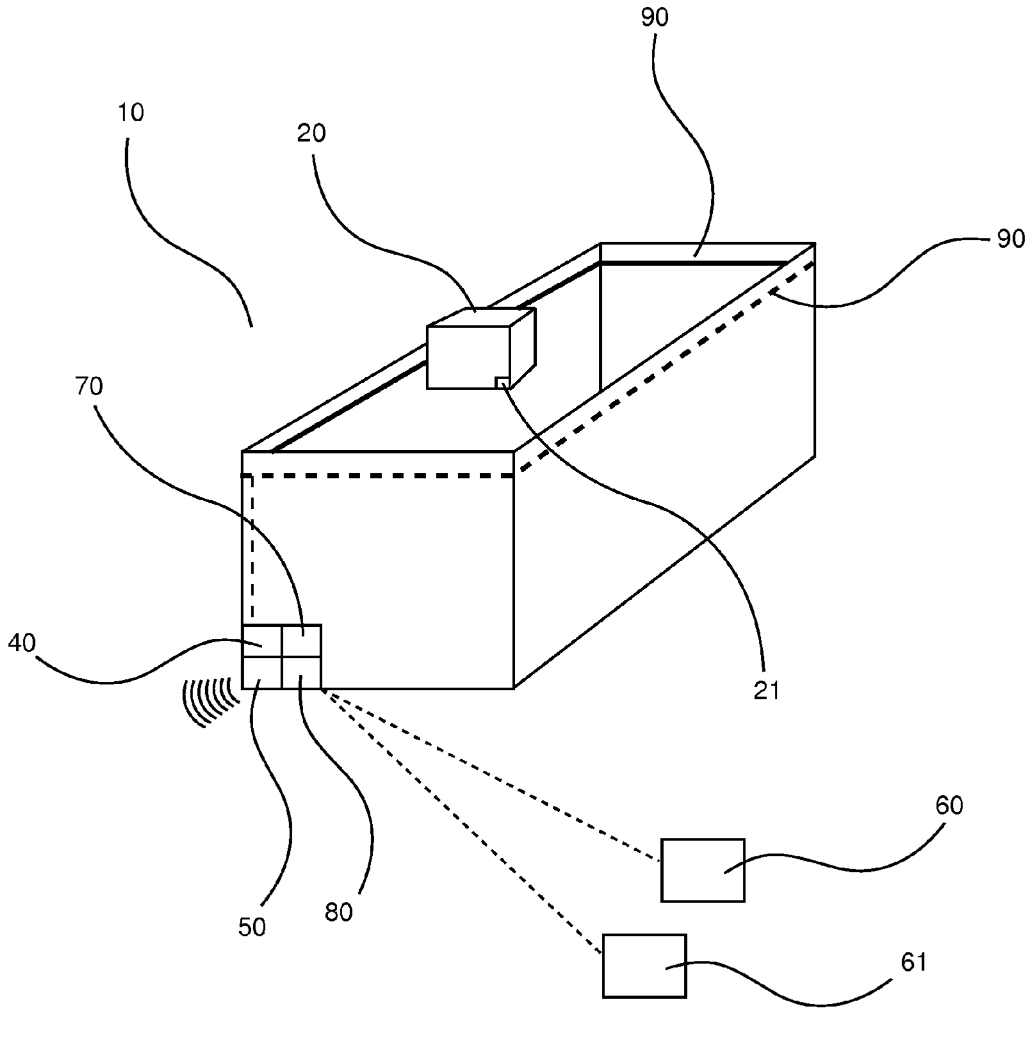
FIG. 3 is a schematic diagram of a package that is adapted to register items according to an exemplary embodiment of the present invention.

FIG. 3 shows a simultaneous surveillance of several transponders 21. This occurs e.g. after a loading procedure of the package. A sensing device 90 for items 20 allows reading out data from the respective transponders 21. These information could contain the measured data as well as identification information, e.g. to identify the items and/or the package or packages.

The communication module 80 furthermore allows a transmission of information to a receiver 61 or to a surveillance central 60 about an incorporation of items to a package or about influences on the package or the items contained in it.

In the case, that the communication module 80 is equipped respectively it could send a text notification to the surveillance central 60 or to the receiving means 61. By this way, it is possible to inform an original shipper about a correct number and correct transport/storage conditions of items in a package.

Preferred and alternative embodiments are described below relating to RF smart labels and sensors, software and processes particularly for monitoring and analyzing the transport influence of an item product. The described sensors and sensors act as "live" dates that tell consumers if a product is fresh and that alert before items become perished.

The sensor monitors temperature, integrates it over time while referencing a data table containing the transport influence parameters for the tagged product, as may be previously provided or understood by an item producer.

The Sentinel Smart Module is a small multi-purpose device that is designed for use when shipping high value items or items where special care is needed.

With very small dimensions—preferably a few centimeters, e.g. 1 centimeter to 20 centimeter to each of its directions, it is designed to be placed inside an item to provide real-time data transfer of any combination of the following information:

Item temperature data
Shock and vibration data
Light data
Sound/decibel data
Moisture/Humidity data
Item content tamper alerts
GPS location
Environmental pressure data Designed for use with either rechargeable or non-rechargeable batteries, the device uses a variety of ways to communicate and pass data. With cellular, Wi-Fi, Satellite or RFID scans, the data received from the internal sensors can be transmitted in real-time or on demand. To insure that the device is not operational while on aircraft, three redundant detection methods are used to determine if the module is on a plane.

1.) The first method was using an internal sensor that detects the transponder signal that is emitted by an aircraft. With a range of up to 400 yards, the sensor could be fine tuned to ensure reliable transponder detection. When a transponder signal was detected, the module would not send data and would wait until no signal was detected.

2.) The second method was using an internal sensor to detect aircraft pressurization. If pressurization was detected, the module would not send data until depressurization occurs.

3.) The 400 cycles sound that is emitted from an aircraft is detected and the module will not send data until the engines are shut down.

The module collects data from all on-board sensors such as temperature, GPS, vibration etc. and caches the information until it can be sent safely via the desired communications method. Once information is received it is updated on the server and the data is then distributed through a variety of dynamic interfaces. A small audible siren contained within the module can be manually activated to emit a loud piercing sound to enable individuals to quickly locate an item in an area that may have many packages. The module sends email and SMS alerts to shippers and/or item recipients to proactively provide item location and environmental conditions such as temperature. Additionally, if the item environment falls outside of a predetermined tolerance, an audible alert on the item can be initiated and/or the shipper and/or the recipient can be notified.

An exemplary embodiment of the present invention implements the idea to implement various individual sensors in/or to a package and to use these sensors together for a specific purpose or use for the transportation industry and the use in the individual shipments of a customer.

The ability to locate high-value and sensitive shipments is important. With the ability to monitor numerous environmental conditions such as temperature, sensitive shipments such as pharmaceuticals can be monitored and total item visibility can be provided.

The combination of digital sensing and a radio frequency (RF) for input and output of sensing data makes possible a new class of sensors, including sensors that monitor and report the integrity of a product, (e.g. how well the quality of the product has been maintained over time). It is desired to have a system that utilizes RF technology for the communication of precision, temperature-dependent shelf-life and other time-dependent sensor monitoring of item products.

A sentinel indicator system is provided in accordance with an exemplary embodiment of the present invention that includes a RFID transponder and a sentinel sensor. The RFID transponder includes a RF integrated circuit coupled with an antenna. The sensor monitors the time and temperature of the item. A determining module receives time- and temperature-dependent measurement data from the item integrity sensor and determines a current status. A communication interface to the RFID transponder permits a RFID reader to retrieve current status data corresponding to the status determined by the determining module.

An exemplary system further includes a power management module.

According to one aspect of an exemplary embodiment of the present invention, a memory module may contain data representing one or more predefined temperature-dependent shelf-life trends. The determining module determines the current status by applying the measurement data to the trend data from the memory module.

According to another aspect, one or more memory media may contain a RFID transponder program portion for controlling the RFID transponder, and a dedicated sensor data portion that contains the status data, or special commands for retrieving the data, or a combination thereof. The data may be directly accessible by a RF reader without disturbing the sensor.

In a further aspect, the power management module may periodically activate the monitoring component from a sleep or other low power state to gather the sensor measurements.

In a further aspect, a system for monitoring sentinel over multiple segments of product supply chain includes multiple sentinel indicator systems configured for transferring status data from at least a first indicator system to a second indicator system.

According to another aspect, the status data may include a transport influence log that tracks time at fractions of transport influence lost. In a further aspect, a custody log may track information relating to multiple custody periods over an item product's transport influence.

To improve the described functions, it is especially advantageous that the transponder relates the data from the sensors independently.

This allows a choice of services for a data transmission. For example a customer can choose, if he wants to monitor one or more of the following measured data: position of items, influence of shock, influence of temperature, influence of atmosphere or their impact on the item, e.g. the temperature of an item within the container.

This allows e.g. a flexible choice, if different data should be transmitted from the transponder to a receiving unit.

An example for this is, that e.g. the position data of the item—respectively the package are transmitted, whereas other properties, e.g. the temperature of the item are not transmitted.

This allows different qualities of service/service levels.

It is advantageous, that a logical note of a logistics system decides about a selection of data which is transmitted from the transponder to the receiving unit.

It is advantageous, that unit sends information to the transponder about a desired selection of a data.

A user is enabled to make the selection of the types of data to be transmitted.

Therefore, the user is enabled to perform this selection at a webpage.

Figure 4:
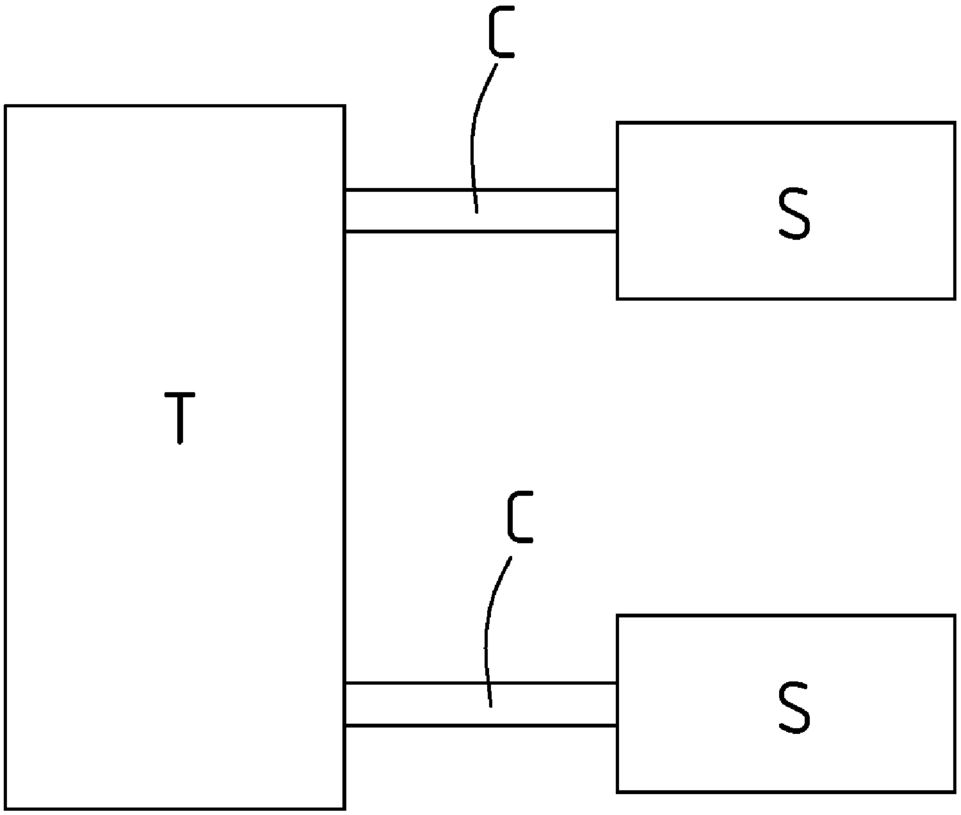
FIG. 4 is a block diagram showing a combination of a sending unit with two sensors according to an exemplary embodiment of the present invention.

FIG. 4 shows a schematic overview of a combination between a transmission unit T and two sentinel sensors S according to an exemplary embodiment of the present invention. The transmission unit T and the two sentinel sensors S are connected through a communication link C.

Those skilled in the art understand that a combination of one transmission unit with two sentinel sensors S is only one example of a combination between one or more transmission units with sentinel sensors.

An exemplary embodiment of the present invention includes a various combination of sentinel sensors and transmission units.

For example, it is possible to combine more sensors of a same type to obtain a two or three dimensional picture of a unit to be measured, e.g. to obtain a graphical representation of temperatures measured.

However, it is especially advantageous to implement different sensors to allow a measurement of a different data as e.g. temperature, humidity or influence of radiation.

It is furthermore advantageous, to implement a different transmission units. This allows e.g. an operation with a different operation conditions, e.g. with different operation frequency e.g. UHF, HF.

It is furthermore advantageous to implement more transmission units of the same kind to improve reading quality or reading velocity. Such implementations are especially advantageous if a reading of data has to be performed quickly and/or in an especially reliable manner.

In such a case, it is advantageous to give the transponders a certain geometry—e.g. in the form of a net.

Especially are comprised:

- several sentinel sensors of the same type with one transmission unit;
- several different sentinel sensors with one transmission unit T;
- several transmission units T with several sentinel sensors as of the same type;
- several transmission units of the same type with several different sentinel sensors;
- several different transmission units with several different sentinel sensors S and
- several different transmission units T with sentinel sensors S of the same type.

The connection between the transmission unit and the sentinel sensors S can be carried out in different ways, e.g. wireless or via a certain connector. The connecting element according to the invention includes of course as well wireless connections as connection with at least one wire.

Of course it is possible, to utilize all kinds of geometry to connect one or more transmission units T with the sentinel sensors S.

In one exemplary embodiment of the invention, the connecting unit C is formed as a stripe.

A formation as a stripe has the advantage, that the sentinel indicator system can be implemented in the package easily.

It is, of course, useful to integrate a sentinel indicator system in a Shipment control and management system.

Advantageously, measurements are carried out after a certain time, or at a certain event, e.g., by reaching a certain place, e.g., a carrier or a warehouse for storing the package.

However, it is also possible to stimulate the sensors to carry out a measurement by a certain signal.

Such a signal can be emitted by a control unit.

Especially advantageous places for carrying out a measurement and/or for stimulating a measurement are a clients warehouse, a freight terminal, a truck, a plane, a ship, a freight forwarder warehouse and a destination.

An exemplary embodiment of the present invention allows an improvement of the logistics system for a transport of a package from a starting point to a receiving point.

The logistics system may be equipped in a way, that it contains a logical node, which is capable of sending controlling information—to at least two sensors of a sentinel indicating system and that it furthermore contains at least one reading unit for receiving data from the sentinel sensors.

Various units can be used to transmit data to the controlling unit. It is especially useful to utilize transmission units, which can also be used for other purposes, such as a transponder.

Preferred communication standards are according to RFID transmission standards and/or according to mobile communication standards, as for example blue tooth, GSM, GPRS or UMTS or satellite communication standards.

LIST OF REFERENCE NUMERALS

10 package/container
20 items
21 transponder
30 sentinel sensor
40 computation device
50 determination device
60 surveillance central
61 receiver, receiving device
70 humidity control
80 communication module
90 sensing device
100 protective coating
110 bottom of the package.

What is claimed is:

1. A method for monitoring a package for storage and/or transport of at least one item, the method comprising:

monitoring at least two physical properties of an time by at least two sentinel sensors, where at least one of the sensors is connected to a memory module storing predefined or measured data;

receiving time- and temperature-dependent measurement data from the sentinel sensor by a determining module;

determining a current status by the determining module by applying the measurement data to trend data from the memory module containing data representing one or more predefined temperature-depended shelf-life trends as the trend data;

permitting a reading unit for receiving data from the sentinel sensors to retrieve current status data corresponding to the current status determined by the determining module via a communications interface to a transmission unit, which is a transponder including an integrated circuit coupled to an antenna and which executes a decision about a selection of data to be transmitted; and taking the decision by a logical node about a selection of data, which is transmitted from the transmission unit to a receiving unit, wherein the transmission unit comprises alert and sensor status data for a selection desired and made by a user and program instructions for relaying communications between the receiving unit and the sensor and is adapted to operate according to a mobile communication standard.

2. The method recited in claim 1, wherein the transmission unit is adapted to relate the data from the sensors independently.

3. The method recited in claim 1, wherein at least one of the sensors is adapted to detect an influence of parameters which require a change of the transmission of data.

4. The method recited in claim 1, wherein the user is enabled to perform the selection of the types of data at a webpage.

5. A sentinel indicator system, comprising:

a transmission unit as a transponder including an integrated circuit coupled with an antenna adapted to operate according to a mobile communication standard;

at least two sentinel sensors adapted to monitor at least two physical property of an item;

a memory module storing predefined or measured data containing data representing one or more predefined temperature-dependent shelf-life trends;

a determining module that is adapted to receive time- and temperature-dependent measurement data from the sentinel sensor and determining a current status by applying the measurement data to the trend data from the memory module;

a communication interface that is adapted to permit a reading unit for receiving data from the sentinel sensors to retrieve current status data corresponding to the current status;

a logical node for taking a decision about a selection of data which is transmitted from a transmission unit to a receiving unit;

a power management module; and wherein the transmission unit executing the decision about a selection of data to be transmitted is adapted to process alert and sensor status data for a selection desired and made by a user and program instructions for relaying communications between the receiving unit and the sensor.

6. The sentinel indicator system recited in claim 5, comprising one or more additional sentinel sensors also communicatively coupled with the transponder permitting the same or a different reader, or both, to retrieve item data measured by the one or more additional sensors.

7. The sentinel indicator system recited in claim 5, wherein the module compares the status data to one or more predetermined trends, and provides an alert when at least one impact data has reached a critical value.

8. The sentinel indicator system recited in claim 5, comprising one or more additional item integrity sensors also communicatively coupled with the transponder being adapted to permit the same or a different reader, or both, to retrieve item data measured by the one or more additional sensors.

9. The sentinel indicator system recited in claim 5, wherein the power management module periodically activates the monitoring component from a sleep or other low power state to gather the sensor measurements.

10. A logistics system for transporting a package with at least one item from a starting point to a receiving point, the logistics system comprising a logical node that is adapted to send controlling information to at least two sensors of a sentinel indicating system and to contain at least one reading unit for receiving data from the sentinel sensors, where the sentinel indicator system comprises:

a transmission unit as a transponder including an integrated circuit coupled with an antenna adapted to operate according mobile communication standard;

at least two sentinel sensors adapted to monitor at least two physical property of an item;

a memory module storing predefined or measured data representing one or more predefined temperature-dependent shelf-life trends;

a determining module that is adapted to receive time-and-temperature-dependent measurement data from the sentinel sensor and determining a current status by applying the measurement data to the trend data from the memory module;

a communication interface that is adapted to permit a reading unit for receiving data from the sentinel sensors to retrieve current status data corresponding to the current status;

a logical node for taking a decision about a selection of data which is transmitted from a transmission unit to a receiving unit;

a power management module; and wherein the transmission unit executing the decision about a selection of data to be transmitted is adapted to process alert and sensor status data for a selection desired and made by a user and program instructions for relaying communications between the receiving unit and the sensor.

11. The sentinel indicator system recited in claim 5, wherein at least one of the sensors is equipped in a way, that it is capable of detecting an influence of parameters which require a change of the transmission of data.

12. The sentinel indicator system recited in claim 5, wherein the sensor is adapted to detect a transponder signal emitted by an aircraft, or to detect aircraft pressurization, or to detect a 400 cycle sound emitted from an aircraft in order to be non operational while on aircraft.

13. The sentinel indicator system recited in claim 12, wherein the memory module collects data from all on-board sensors such as temperature, GPS, vibration etc, and caches the information until it can be sent safely via the desired communications method.

14. The sentinel indicator system recited in claim 5, wherein more sensors of a same type are combined to obtain a two or three dimensional picture of a unit to be measured.

15. The sentinel indicator system recited in claim 5, wherein more transmission units of the same kind are implemented to improve reading quality or reading velocity.

16. The sentinel indicator system recited in claim 15, wherein the more transmission units are arranged in the form of a net.

* * * * *